United States Patent
Buehler et al.

(10) Patent No.: US 10,153,097 B2
(45) Date of Patent: Dec. 11, 2018

(54) ELECTROLYTE ADDITIVE FOR HYBRID SUPERCAPACITORS TO REDUCE CHARGE TRANSFER RESISTANCE, AND HYBRID SUPERCAPACITOR INCLUDING THE SAME

(71) Applicant: Robert Bosch GmbH, Stuttgart (DE)

(72) Inventors: Elisabeth Buehler, Tamm (DE); Mathias Widmaier, Magstadt (DE); Severin Hahn, Kirchheim Unter Teck (DE); Thomas Eckl, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/608,363

(22) Filed: May 30, 2017

(65) Prior Publication Data
US 2017/0352497 A1    Dec. 7, 2017

(30) Foreign Application Priority Data
Jun. 7, 2016    (DE) .......................... 10 2016 209 963

(51) Int. Cl.
*H01G 11/64*    (2013.01)
*H01G 11/28*    (2013.01)
(Continued)

(52) U.S. Cl.
CPC ............. *H01G 11/64* (2013.01); *H01G 11/28* (2013.01); *H01G 11/30* (2013.01); *H01G 11/52* (2013.01); *H01G 11/60* (2013.01); *H01G 11/62* (2013.01)

(58) Field of Classification Search
None
See application file for complete search history.

(56) References Cited

U.S. PATENT DOCUMENTS 8,148,017 B2    4/2012   Matsui et al.
2009/0176164 A1*  7/2009   Matsui .................. H01G 9/038
                                                 429/342

FOREIGN PATENT DOCUMENTS

EP          1359637 A1    11/2003
WO     2015/043923 A1     4/2015

OTHER PUBLICATIONS

Byeongjin Baek, Cheolsoo Jung: Enhancement of the Li+ ion transfer reaction at the liCoO2 interface by 1,3,5-trifluorovenzene. In: Electrochemica Acta, 55,—2010, 3307-3311.

(Continued)

*Primary Examiner* — Dion Ferguson
(74) *Attorney, Agent, or Firm* — Norton Rose Fulbright US LLP; Gerard Messina

(57) ABSTRACT

A hybrid supercapacitor, including at least one negative electrode having a statically capacitive active material, an electrochemical redox-active material, or a mixture of them; at least one positive electrode having a statically capacitive active material, an electrochemical redox-active material, or a mixture of them; at least one separator situated between the at least one negative electrode and the at least one positive electrode; and an electrolyte mixture; with the provision that at least one electrode includes a statically capacitive active material, and at least one electrode includes an electrochemical, redox-active material; the electrolyte mixture being a liquid electrolyte mixture and including at least one liquid, aprotic, organic solvent, at least one conducting salt, and at least one at least partially halogenated, aromatic compound.

7 Claims, 1 Drawing Sheet

(51) Int. Cl.
*H01G 11/30* (2013.01)
*H01G 11/52* (2013.01)
*H01G 11/60* (2013.01)
*H01G 11/62* (2013.01)

(56) References Cited

OTHER PUBLICATIONS

Chung ho Lee, Fan Xu, Cheolsoo Jung: Influence of the electrolyte distribution near the micropores of the activated carbon (AC) electrode on high rate performance of highvoltage capacitors. In: Electrochemica Acta, 131, 2014, 240-244.

Zhang, "A review on electrolyte additives for lithium-ion batteries" Journal of Power Sources 162 (2006) 1379-1394.

\* cited by examiner

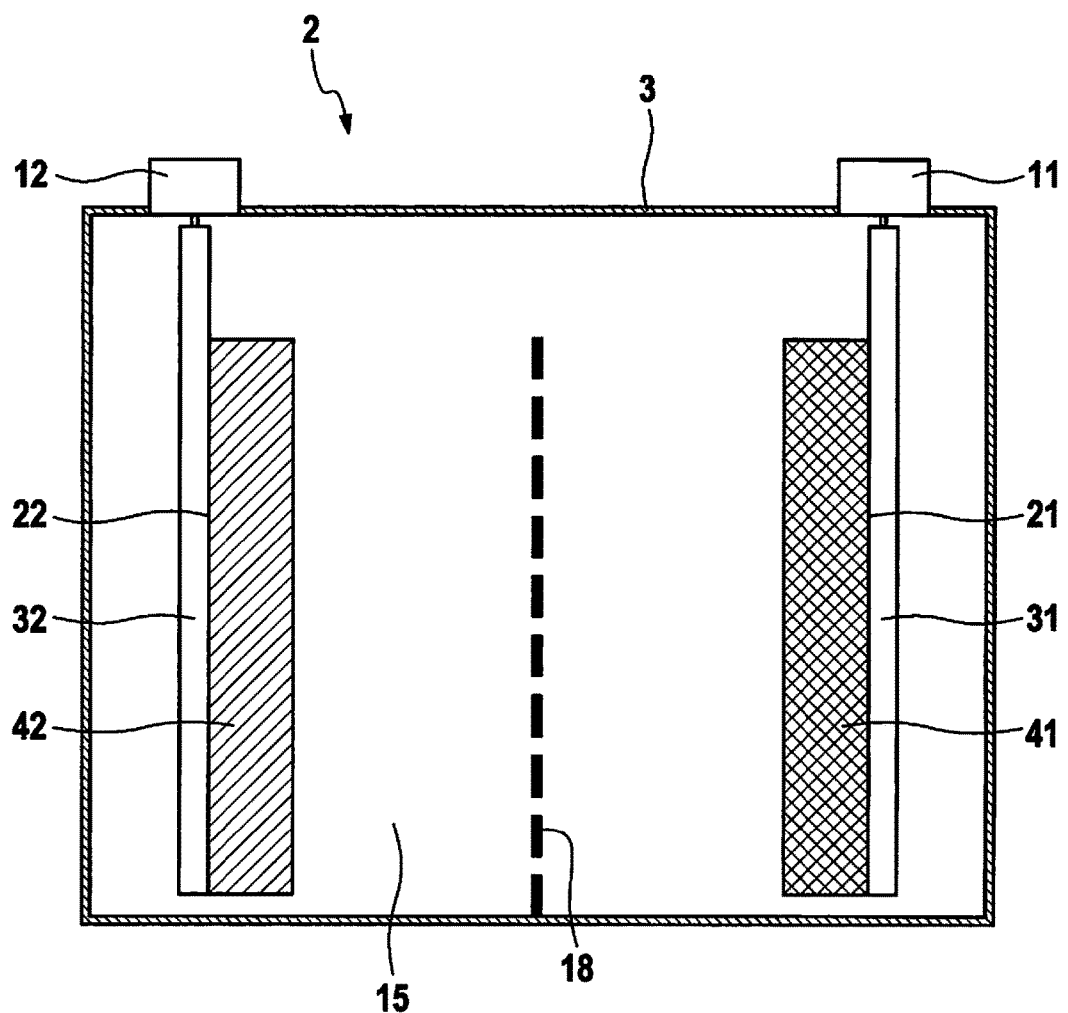

ELECTROLYTE ADDITIVE FOR HYBRID SUPERCAPACITORS TO REDUCE CHARGE TRANSFER RESISTANCE, AND HYBRID SUPERCAPACITOR INCLUDING THE SAME

CROSS REFERENCE

The present application claims the benefit under 35 U.S.C. § 119 of German Patent Application No. DE 102016209963.9 filed on Jun. 7, 2016, which is expressly incorporated herein by reference in its entirety.

BACKGROUND INFORMATION

The storage of electrical energy by electrochemical energy storage systems such as electrochemical capacitors (supercapacitors) or electrochemical primary or secondary batteries has been available for many years. In this context, the above-mentioned energy storage systems differ in the principle forming the basis of the energy storage.

Generally, supercapacitors include a negative and a positive electrode, which are separated from each other by a separator. In addition, an electrolyte that is ionically conductive is situated between the electrodes. The storage of electrical energy is based on the formation of an electrochemical double layer on the surfaces of the electrodes of the supercapacitor in response to applying a voltage to them. This double layer is formed by solvated charge carriers from the electrolyte, the charge carriers positioning themselves on the surfaces of the oppositely electrically charged electrodes. A redox reaction is not involved in this type of energy storage. Therefore, supercapacitors may theoretically be recharged as much as desired and consequently have a very long service life. The power density of the supercapacitors is also high, whereas the energy density is rather low in comparison with, for example, lithium ion batteries.

However, storage of energy in primary and secondary batteries takes place via a redox reaction. In this context, these batteries also include, generally, a negative and a positive electrode that are separated from each other by a separator. A conductive electrolyte is situated between the electrodes, as well. In lithium ion batteries, one of the most widely used types of secondary batteries, energy is stored by intercalation of lithium ions into the active electrode materials. During operation of the battery cell, that is, during discharge, electrons flow in an external electrical circuit, from the negative electrode to the positive electrode. In a discharge operation, lithium ions migrate, within the battery cell, from the negative electrode to the positive electrode. In this context, the lithium ions are reversibly removed from the active material of the negative electrode, which is also referred to as delithiation. In a charging process of the battery cell, lithium ions migrate from the positive electrode to the negative electrode. In this context, the lithium ions intercalate again into the active material of the negative electrode in a reversible manner, which is also referred to as lithiation.

Lithium ion batteries are characterized in that they have a high energy density, that is, they are able to store a large amount of energy per unit mass or volume. In exchange, however, they only have a limited power density and service life. This is disadvantageous for many applications, which means that in these areas, lithium ion batteries may not be used or only used to a small extent.

Hybrid supercapacitors represent a combination of these technologies and are capable of closing the gap in the potential uses that lithium battery technology and supercapacitor technology have.

Generally, hybrid supercapacitors also have two electrodes, which each include a current diverter and are separated from each other by a separator. The transport of the electrical charges between the electrodes is ensured by electrolytes or electrolytic compounds. Generally, the electrodes include, as an active material, a conventional supercapacitive material (also referred to below as a statically capacitive active material), which is capable of entering into a redox reaction with the charge carriers of the electrolyte and forming an intercalation compound out of them (also referred to below as an electrochemical, redox-active material). Therefore, the energy storage principle of the hybrid supercapacitors is based on the formation of an electrochemical double layer in combination with the formation of a faradic lithium intercalation compound. The energy storage system obtained in this manner has a high energy density, with a simultaneously high power density and long service life.

In light of efforts to utilize energy as completely as possible, there is a need for energy storage systems, which provide as high an energy storage efficiency as possible, in order to be able to store even small quantities of energy with as low a loss as possible.

The use of electrolyte additives for improving the properties of electrolytic compounds for lithium ion batteries is described in the related art, for example, in the Journal of Power Sources 162 (2006), 1379-1394. In Electrochimica Acta, 55 (2010) 3307-3311, Baek describes that 1,3,5-trifluorobenzene may increase the transfer rate of lithium cations at the cathode of lithium ion batteries.

U.S. Pat. No. 8,148,017 describes the use of fluorinated benzene derivatives as an electrolyte additive in double-layer capacitors. The benzene derivatives are selected from hexafluorobenzene, pentafluorobenzene, 1,2,3,4-tetrafluorobenzene, 1,2,3,5-tetrafluorobenzene, 1,2,4,5-tetrafluorobenzene and 1,2,3-trifluorobenzene.

PCT Application No. WO 2015/043923 describes electrolyte compounds, including lithium hexafluorophosphate ($LiPF_6$) and a mixture of a cyclic carbonate and an acyclic carbonate, as well as their use as a solvent or solvent additive for lithium ion batteries and supercapacitors.

An object of the present invention is to provide an electrochemical energy storage system, which has both a high power density and service life and simultaneously stores energy particularly efficiently. This object may be achieved by example embodiment of the present invention, as described below.

SUMMARY

The present invention relates to a hybrid supercapacitor, including
- at least one negative electrode having a statically capacitive active material, an electrochemical redox-active material, or a mixture of them;
- at least one positive electrode having a statically capacitive active material, an electrochemical redox-active material, or a mixture of them;
- at least one separator situated between the at least one negative electrode and the at least one positive electrode; and
- an electrolyte mixture;

with the provision that at least one electrode includes a statically capacitive active material, and at least one electrode includes an electrochemical, redox-active material, the electrolyte mixture being a liquid electrolyte mixture and including at least one liquid, aprotic, organic solvent, at least one conducting salt, and at least one at least partially halogenated, aromatic compound.

The hybrid supercapacitor of the present invention includes at least one positive electrode and at least one negative electrode. The electrodes each include an electrically conductive current diverter, also called a collector, as well as an active material deposited onto it. The current diverter includes, for example, copper or aluminum as an electrically conductive material. In a preferred specific embodiment, the current diverter of the electrodes is made of aluminum.

A negative active material is deposited onto the negative electrode. The negative active material includes a statically capacitive, active material, an electrochemical redox-active material, or a mixture of them.

In accordance with the present invention, a statically capacitive, active material is a material, which is known from conventional double-layer electrodes and is capable of forming a static double-layer capacitor, in particular, by forming a Helmholtz layer. In this context, it is designed to produce as large a surface area as possible for forming the electrochemical double layer. The electrode material used most often for supercapacitors is carbon in its different forms, such as activated carbon (AC), activated carbon fibers (ACF), carbide-derived carbon (CDC), carbon aerogel, graphite (graphene), and carbon nanotubes (CNTs). Within the scope of the present invention, these electrode materials are suitable as statically capacitive electrode-active materials. Carbon modifications, in particular, activated carbon, are preferably used.

In the spirit of the present invention, an electrochemical, redox-active material is a material, which is known from electrochemical secondary batteries, in particular, lithium ion batteries, and is suitable for entering into a reversible electrochemical or faradic lithium-ion intercalation reaction and/or forming a lithium-ion intercalation compound.

Suitable electrochemical, redox-active materials for the negative electrode include, in particular, lithium titanate, e.g., $Li_4Ti_5O_{12}$, but also lithium vanadium phosphate, e.g., $Li_3V_2(PO_4)_3$.

In a preferred specific embodiment, the negative electrode includes a mixture of statically capacitive, active material and electrochemical, redox-active material, such as a mixture of activated carbon and $Li_4Ti_5O_{12}$. The ratio of capacitive active material to electrochemical redox-active material is preferably in the range of 1:0.25 to 1:1.25.

A positive active material is deposited onto the positive electrode. The positive active material includes a statically capacitive, active material, an electrochemical redox-active material, or a mixture of them.

All of the variants for the negative electrode are correspondingly valid with respect to the statically capacitive material of the positive electrode. The active materials mentioned there are also suitable for the positive electrode.

Suitable electrochemical redox-active materials for the positive electrode include, for example, lithiated intercalation compounds, which are capable of taking up and releasing lithium ions in a reversible manner. The positive active material may include a complex oxide, which contains at least one metal selected from the group including cobalt, magnesium, nickel, as well as lithium.

One specific embodiment of the present invention includes an active material of the positive electrode, the active material containing a compound of the formula $LiMO_2$, M being selected from Co, Ni, Mn, Cr, or mixtures of them, as well as mixtures of them with Al. In particular, $LiCoO_2$ and $LiNiO_2$ are to be mentioned.

In one preferred specific embodiment, the active material of the cathode is a material, which includes nickel, that is, $LiNi_{1-x}M'_xO_2$, where M' is selected from Co, Mn, Cr, and Al, and $0 \leq x < 1$. Examples include lithium nickel cobalt aluminum oxide cathodes (e.g., $LiNi_{0.8}Co_{0.15}Al_{0.05}O_2$; NCA) and lithium nickel manganese cobalt oxide cathodes (e.g., $LiNi_{0.8}Mn_{0.1}Co_{0.1}O_2$; NMC (811) or $LiNi_{0.33}Mn_{0.33}Co_{0.33}O_2$; NMC (111)).

In addition, over-lithiated, layered oxides, are preferred, positive active materials. Examples of these include $Li_{1+x}Mn_{2-y}M_yO_4$ with $x \leq 0.8$, $y < 2$; $Li_{1+Ex}Co_{1-y}M_yO_2$ with $x \leq 0.8$, $y < 1$; $Li_{1+x}Ni_{1-y-z}Co_yM_zO_4$ with $x \leq 0.8$, $y < 1$, $z < 1$ and $y + z < 1$. In the above-mentioned compounds, M may be selected from Al, Mg, and/or Mn.

In particular, two or more of the positive active materials may also be used in combination with one another. A preferred specific embodiment includes, for example, compounds of the formula $n(Li_2MnO_3):n-1(LiNi_{1-x}M'_xO_2)$, where M' is selected from Co, Mn, Cr and Al, and $0 < n < 1$, and $0 < x < 1$.

In addition, spinel compounds (e.g., $LiMn_2O_4$), olivine compounds (e.g., $LiFePO_4$), silicate compounds (e.g., $Li_2FeSiO_4$), favorite compounds (e.g., $LiVPO_4F$, $Li_2MnO_3$, $Li_{1.17}Ni_{0.17}Co_{0.1}Mn_{0.56}O_2$ and $Li_3V_2(PO_4)_3$) are to receive particular mention as suitable positive active materials.

In a preferred specific embodiment, the positive electrode includes a mixture of statically capacitive, active material and electrochemical, redox-active material, such as a mixture of activated carbon and $LiMn_2O_4$. The ratio of capacitive active material to electrochemical redox-active material is preferably in a range of 1:0.25 to 1:1.25.

As further components, the negative active material and/or the positive active material may include, in particular, binding agents such as styrene-butadiene copolymer (SBR), polyvinylidene fluoride (PVDF), polytetrafluoroethylene (PTFE), carboxymethylcellulose (CMC), poly(acrylic acid) (PAA), poly(vinyl alcohol) (PVA) and ethylene propylene diene terpolymer (EPDM), in order to increase the stability of the electrodes. In addition, conductive additives such as conductive carbon black or graphite may be introduced.

The separator serves the purpose of protecting the electrodes from direct contact with each other, and therefore preventing a short circuit. At the same time, the separator must ensure the transfer of ions from one electrode to the other. Suitable materials are characterized, in that they are made of an insulating material having a porous structure. Suitable materials include, in particular, polymers such as cellulose, polyolefins, polyester, and fluorinated polymers. Particularly preferred polymers include cellulose, polyethylene (PE), polypropylene (PP), polyethylene terephthalate (PET), polytetrafluoroethylene (PTFE), and polyvinylidene fluoride (PVdF). In addition, the separator may include ceramic materials or be made of them, provided that substantial (lithium) ion transfer is ensured. In particular, ceramics, which include MgO or $Al_2O_3$, are to be mentioned as materials. The separator may be made of a layer of one or more of the above-mentioned materials, or also of a plurality of layers, in each of which one or more of the above-mentioned materials are combined with one another.

In addition, the hybrid supercapacitor includes an electrolyte mixture that contains at least one aprotic organic solvent, which is liquid in conditions that normally prevail in electrochemical energy storage systems during operation (that is, at a temperature in a range of −40° C. to 100° C., in particular, 0° C. to 60° C., and at a pressure in a range of 0.5 to 5 bar, in particular, 0.8 to 2 bar); at least one conducting salt; as well as at least one at least partially halogenated aromatic compound.

In this connection, liquid means that the solvent has a viscosity η of ≤100 mPa·s, in particular, ≤10 mPa·s. Viscosity η is preferably in a range of 0.01 to 8 mPa·s, in particular, in a range of 0.1 to 5 mPa·s.

Suitable solvents have a polarity sufficient to dissolve the further components of the electrolyte mixture, in particular, the conducting salt or conducting salts. Examples to be mentioned include acetonitrile, tetrahydrofuran, diethyl carbonate, or γ-butyrolactone, as well as cyclic and acyclic carbonates, in particular, propylene carbonate, ethylene carbonate, dimethyl carbonate, diethyl carbonate, ethylene methyl carbonate, ethyl methyl carbonate, as well as mixtures of them. Acetonitrile, propylene carbonate, ethylene carbonate, dimethyl carbonate, diethyl carbonate, ethylene methyl carbonate, ethyl methyl carbonate, as well as mixtures of them, are particularly preferred.

In addition the electrolyte mixture includes at least one conducting salt. In particular, salts having sterically demanding anions and, optionally, sterically demanding cations are suitable. Examples of these include tetraalkylammonium borates such as $N(CH_3)_4BF_4$. However, a particularly suitable class of conducting salts are, in particular, lithium salts. The conducting salt may be selected, for example, from the group that includes lithium chlorate ($LiClO_4$), lithium tetrafluoroborate ($LiBF_4$), lithium hexafluorophosphate ($LiPF_6$), lithium hexafluoroarsenate ($LiAsF_6$), lithium trifluoromethanesulfonate ($LiSO_3CF_3$), lithium bis(trifluoromethylsulphonyl)imide ($LiN(SO_2CF_3)_2$), lithium bis(pentafluoroethylsulphonyl)imide ($LiN(SO_2C_2F_5)_2$), lithium bis(oxalato)borate (LiBOB, $LiB(C_2O_4)_2$), lithium difluoro(oxalato)borate ($LiBF_2(C_2O_4)$), lithium tris(pentafluoroethyl)trifluorophosphate ($LiPF_3(C_2F_5)_3$), and combinations of them.

In accordance with the present invention, the use of an at least partially halogenated aromatic compound as an additive in the electrolyte mixture of a hybrid supercapacitor increased the energy storage efficiency and simultaneously improved the rate capability.

In this context, the at least partially halogenated aromatic compound may be a monocyclic aromatic compound or also a di- or polycyclic aromatic compound, in which the two or more aromatic rings may be condensed with one another. Examples include benzene derivatives, bi- or polyphenyl derivatives, naphthalene derivatives, anthracene derivatives, pyrene derivatives, etc. The aromatic compound is at least partially halogenated, that is, at least a portion of the hydrogen atoms are replaced by halogen atoms, selected from fluorine, chlorine, bromine and iodine, in particular, fluorine and chlorine. In this context, there may be one type of halogen atom or different types of halogen atoms in one aromatic compound.

The halogenated aromatic compound preferably includes 6 to 30 carbon atoms, in particular, 6 to 18 carbon atoms. In one preferred specific embodiment, the halogenated aromatic compound is an at least partially chlorinated and/or at least partially fluorinated aromatic compound having 6 to 18 carbon atoms.

In one further preferred specific embodiment, the at least partially halogenated aromatic compound is an at least partially halogenated benzene derivative, in particular, a chlorinated and/or fluorinated benzene derivative. Suitable, particularly preferred examples include 1,2,3-trichlorobenzene, 1,2,4-trichlorobenzene, 1,3,5-trichlorobenzene, 1,2,3,4-tetrachlorobenzene, 1,2,3,5-tetrachlorobenzene, 1,2,4,5-tetrachlorobenzene, pentachlorobenzene, hexachlorobenzene, 1,2,3-trifluorobenzene, 1,2,4-trifluorobenzene, 1,3,5-trifluorobenzene, 1,2,3,4-tetrafluorobenzene, 1,2,3,5-tetrafluorobenzene, 1,2,4,5-tetrafluorobenzene, pentafluorobenzene, and hexafluorobenzene. Further examples include aromatic compounds, which are simultaneously at least partially substituted with fluorine and chlorine atoms, such as 1,3-difluoro-2-chlorobenzene, 1,3-dichloro-2-fluorobenzene, 1,2-difluoro-3-chlorobenzene, 1,2-dichloro-3-fluorobenzene, 1-fluoro-3,5-dichlorobenzene, 1-chloro-3,5-difluorobenzene, 1,2-difluoro-3,4-dichlorobenzene, etc.

In one further preferred specific embodiment, the at least partially halogenated aromatic compound is an at least partially fluorinated benzene derivative, in particular, one of the above-mentioned fluorinated benzene derivatives.

In a further particularly preferred specific embodiment, the at least partially halogenated aromatic compound is selected from 1,3,5-trichlorobenzene and 1,3,5-trifluorobenzene. In particular, 1,3,5-trifluorobenzene is preferred.

The electrolyte mixture includes the at least one partially halogenated aromatic compound in an amount of up to 10% by weight, preferably 0.1 to 9% by weight, in particular, 0.5 to 5% by weight, for example, 2% by weight, based on the total weight of the electrolyte mixture.

In addition, the electrolyte mixture may include further additives, which are suitable for improving its properties, provided they are sufficiently soluble in nonpolar solvents and the presence of the additives does not negatively affect the functions of the above-described components. Suitable additives are known to one skilled in the art. For example, flameproofing agents, wetting agents, and agents, which support the formation of a preferred solid electrolyte interface (SEI) on the electrode surfaces, may be added to the electrolyte mixture. In particular, compounds having unsaturated hydrocarbon groups are to be mentioned for this.

These additives are preferably present in the electrolyte mixture at a concentration of 0 to 3 mol/L, in particular, 0.1 to 2 mol/L.

Example embodiment of the present invention also include a liquid electrolyte mixture for a hybrid supercapacitor, including at least one liquid, aprotic, organic solvent, at least one conducting salt, and at least one at least partially halogenated, aromatic compound. The statements made above with regard to the components are valid. The liquid electrolyte mixture may be used in a hybrid supercapacitor in an advantageous manner.

A hybrid supercapacitor according to the present invention is advantageously used in an electric vehicle (EV), in a hybrid vehicle (HEV), or in a plug-in hybrid vehicle (PHEV). In particular, the hybrid supercapacitor may be advantageously used in recuperative systems. Further examples of use include tools, as well as consumer electronics products. In this context, tools may be understood to mean, in particular, household tools as well as garden tools. Consumer electronics products may be understood to mean, in particular, cellular phones, tablet PC's or notebooks.

The example hybrid supercapacitor of the present invention distinguishes itself in that the transfer rate of the lithium cations at the electrodes is increased by adding an electrolyte additive from the group of at least partially halogenated aromatics, and, in particular, by adding 1,3,5-trifluorobenzene. This is accomplished through a reduction of the charge transfer resistance. At the same time, the rate capability and charging rate of the hybrid supercapacitor are increased. The increase in efficiency, achieved in this manner, of the hybrid supercapacitor as an energy store, for example, in recuperative systems, thus improves the potential for saving fuel and contributes towards reducing the $CO_2$ emissions.

BRIEF DESCRIPTION OF THE DRAWINGS

Specific embodiments of the present invention are explained in more detail below in light of the figures.

FIG. 1 shows a schematic view of a hybrid supercapacitor.

DETAILED DESCRIPTION OF EXAMPLE EMBODIMENTS

A hybrid supercapacitor 2 is schematically represented in FIG. 1. Hybrid supercapacitor 2 includes a capacitor housing 3, which is formed in the shape of a prism, and in the case at hand, in the shape of a block. In the present case, capacitor housing 3 is constructed to conduct electricity and is made, for example, of aluminum. However, capacitor housing 3 may also be made of an electrically insulating material, for example, plastic.

Hybrid supercapacitor 2 includes a negative terminal 11 and a positive terminal 12. A voltage provided by hybrid supercapacitor 2 may be tapped across terminals 11, 12. In addition, hybrid supercapacitor 2 may also be charged via terminals 11, 12. Terminals 11, 12 are set apart from one another at a top surface of prism-shaped capacitor housing 3.

An electrode roll, which includes two electrodes, namely, a negative electrode 21 and a positive electrode 22, is situated inside of capacitor housing 3 of hybrid supercapacitor 2. Negative electrode 21 and positive electrode 22 are each constructed as foil and wound to the electrode roll while interposing a separator 18. It is also conceivable for a plurality of electrode rolls to be provided in capacitor housing 3. For example, an electrode stack may also be provided in place of the electrode roll.

Negative electrode 21 includes a negative active material 41, which is constructed as a foil. Negative active material 41 has activated carbon as a basic material (statically capacitive active material), onto which $Li_4Ti_5O_{12}$ (electrochemical redox-active material) is deposited. Negative electrode 21 includes a negative active material 41, which is present in particle form. Additives, in particular, conductive carbon black and binding agents, are situated between the particles of negative active material 41. In this context, negative active material 41 and the above-mentioned additives form, in each instance, a composite, which is constructed as a foil.

Negative electrode 21 further includes a current diverter 31, which is also manufactured as a foil. The composite made up of negative active material 41 and the additives, and the current diverter 31 of the negative electrode, are laid flat on one another and joined to each other. Current diverter 31 of negative electrode 21 is constructed to be electrically conductive and is made of a metal, for example, copper. Current diverter 31 of negative electrode 21 is electrically connected to negative terminal 11 of hybrid supercapacitor 2.

Positive electrode 22 presently includes a positive active material 42 made of a mixture of activated carbon (statically capacitive active material) and $LiMn_2O_4$ (electrochemical redox-active material). Positive electrode 22 includes a positive active material 42, which is present in particle form. Additives, in particular, conductive carbon black and binding agents, are situated between the particles of positive active material 42. The positive active material 42 and the above-mentioned additives form, in each instance, a composite that is constructed as a foil.

Positive electrode 22 further includes a current diverter 32, which is also manufactured as a foil. The composite made up of positive active material 42 and the additives, and the current diverter 32 of the positive electrode, are laid flat on one another and joined to each other. Current diverter 32 of positive electrode 22 is constructed to be electrically conductive and is made of a metal, for example, aluminum. Current diverter 32 of positive electrode 22 is electrically connected to positive terminal 12 of hybrid supercapacitor 2.

Negative electrode 21 and positive electrode 22 are separated from each other by separator 18. Separator 18 is also constructed as a foil. Separator 18 is constructed to be electronically insulating, but transmissive with respect to ionic conductivity, that is, transmissive for ions, in particular, lithium ions.

Capacitor housing 3 of hybrid supercapacitor 2 is filled with a liquid electrolyte mixture 15. In this context, electrolyte mixture 15 surrounds negative electrode 21, positive electrode 22, and separator 18. Electrolyte mixture 15 is also ionically conductive and includes a liquid solvent, in this case, for example, a mixture of at least one cyclic carbonate (e.g., ethylene carbonate (EC), propylene carbonate (PC), butylene carbonate (BC), and at least one linear carbonate (e.g., dimethylene carbonate (DMC), diethyl carbonate (DEC), methyl ethyl carbonate (MEC)), as well as a lithium salt (e.g., $LiPF_6$, $LiBF_4$) and 1,3,5-trifluorobenzene as an additive. The amount of 1,3,5-trifluorobenzene is, for example, 2% by weight, based on the total electrolyte mixture 15.

The present invention is not limited to the above-described exemplary embodiments and the aspects emphasized in them. On the contrary, a number of modifications lying within the scope of the actions of one skilled in the art are possible within the field described herein.

What is claimed is:

1. A hybrid supercapacitor, comprising:
   at least one negative electrode having one of a statically capacitive active material, an electrochemical redox-active material, or a mixture of a statically capacitive active material and a electrochemical redox-active material;
   at least one positive electrode having one of a statically capacitive active material, an electrochemical redox-active material, or a mixture of a statically capacitive active material and an electrochemical redox-active material;
   at least one separator situated between the at least one negative electrode and the at least one positive electrode; and
   an electrolyte mixture;
   wherein at least one of the negative and positive electrodes includes a statically capacitive active material, and at least one of the negative and positive electrodes includes an electrochemical, redox-active material, and wherein the electrolyte mixture is a liquid electrolyte mixture and includes at least one liquid, aprotic, organic solvent, at least one conducting salt, and at least one at least partially chlorinated, aromatic compound.

2. The hybrid supercapacitor as recited in claim 1, wherein the at least one liquid, aprotic, organic solvent is selected from acetonitrile, propylene carbonate, ethylene carbonate, dimethyl carbonate, diethyl carbonate, ethylene methyl carbonate, ethyl methyl carbonate, as well as mixtures of them.

3. The hybrid supercapacitor as recited in claim 1, wherein the at least one conducting salt is a lithium salt.

4. A hybrid supercapacitor, comprising:
- at least one negative electrode having one of a statically capacitive active material, an electrochemical redox-active material, or a mixture of a statically capacitive active material and a electrochemical redox-active material;
- at least one positive electrode having one of a statically capacitive active material, an electrochemical redox-active material, or a mixture of a statically capacitive active material and an electrochemical redox-active material;
- at least one separator situated between the at least one negative electrode and the at least one positive electrode; and
- an electrolyte mixture;
- wherein at least one of the negative and positive electrodes includes a statically capacitive active material, and at least one of the negative and positive electrodes includes an electrochemical, redox-active material, and wherein the electrolyte mixture is a liquid electrolyte mixture and includes at least one liquid, aprotic, organic solvent, at least one conducting salt, and at least one at least partially halogenated, aromatic compound, wherein the at least one at least partially halogenated aromatic compound is 1,3,5-trifluorobenzene.

5. The hybrid supercapacitor as recited in claim 4, wherein the at least one at least partially halogenated aromatic compound makes up to 10% by weight of the total amount of the electrolyte mixture.

6. An electrolyte mixture for a hybrid supercapacitor, comprising at least one liquid, aprotic, organic solvent, at least one conducting salt, and at least one at least partially chlorinated, aromatic compound.

7. A method of using an electrolyte mixture, comprising:
- providing a hybrid supercapacitor; and
- using, in the hybrid supercapacitor, an electrolyte mixture including at least one liquid, aprotic, organic solvent, at least one conducting salt, and at least one at least partially chlorinated, aromatic compound.

* * * * *